June 4, 1963
D. M. HAM
3,092,318
INDICATING DEMAND METER
Filed Nov. 23, 1960
8 Sheets—Sheet 2
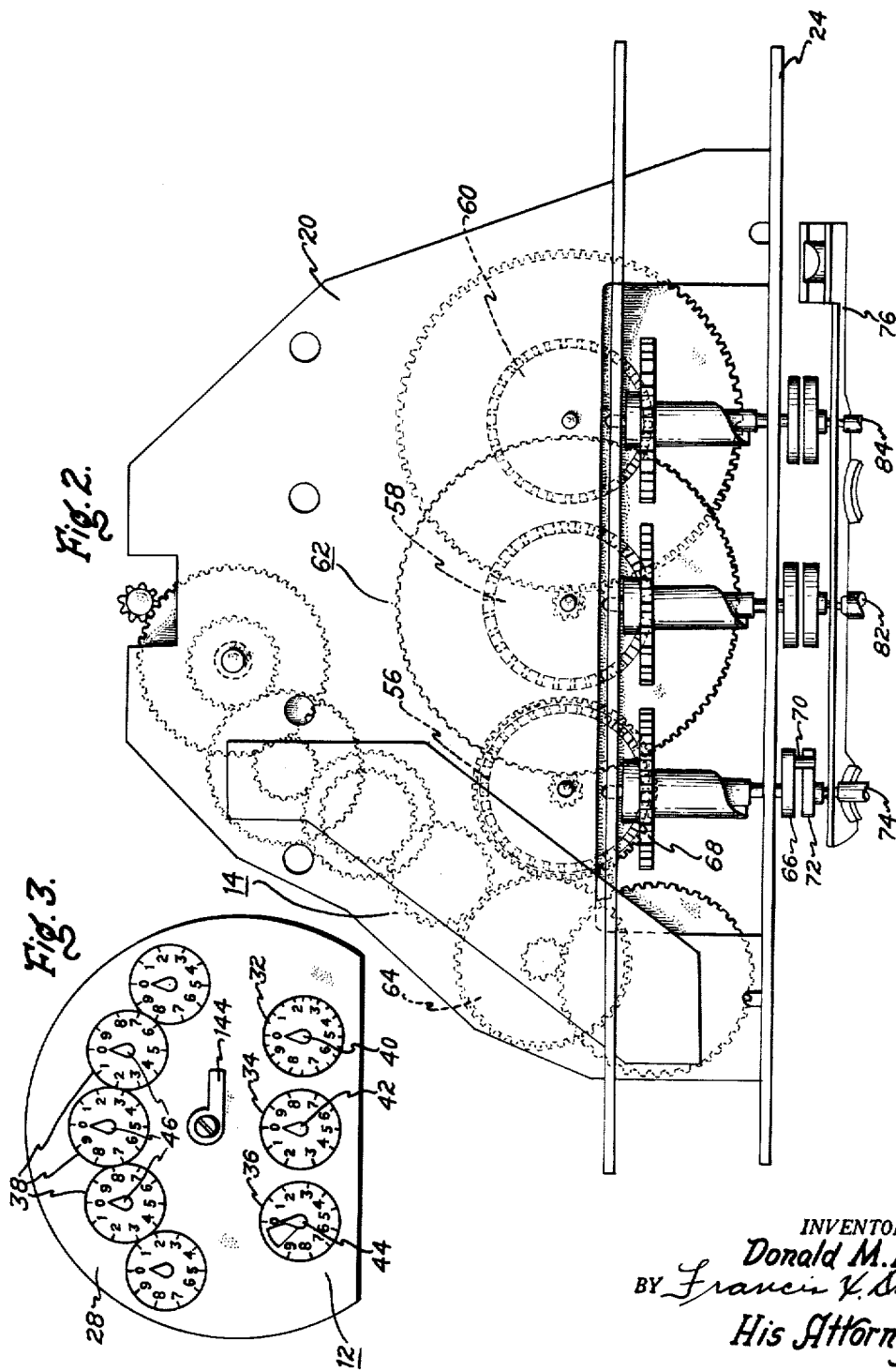
INVENTOR.
Donald M. Ham,
BY Francis K. Doyle
His Attorney.

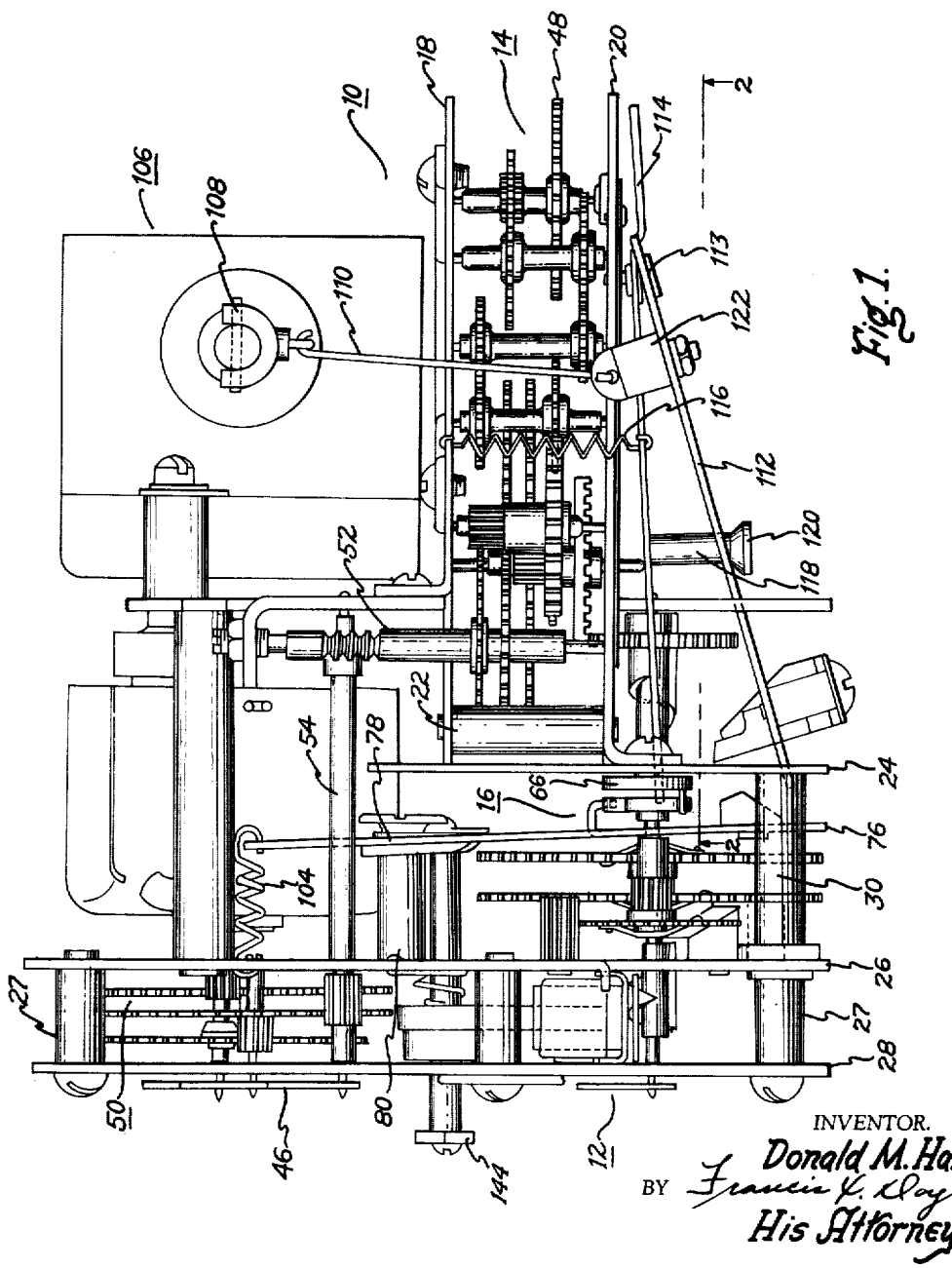

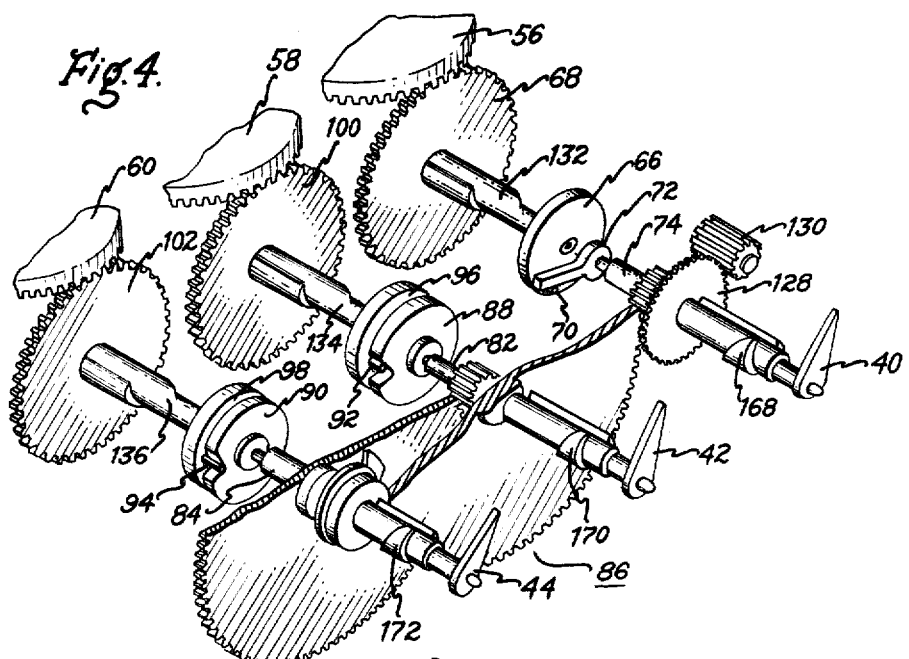
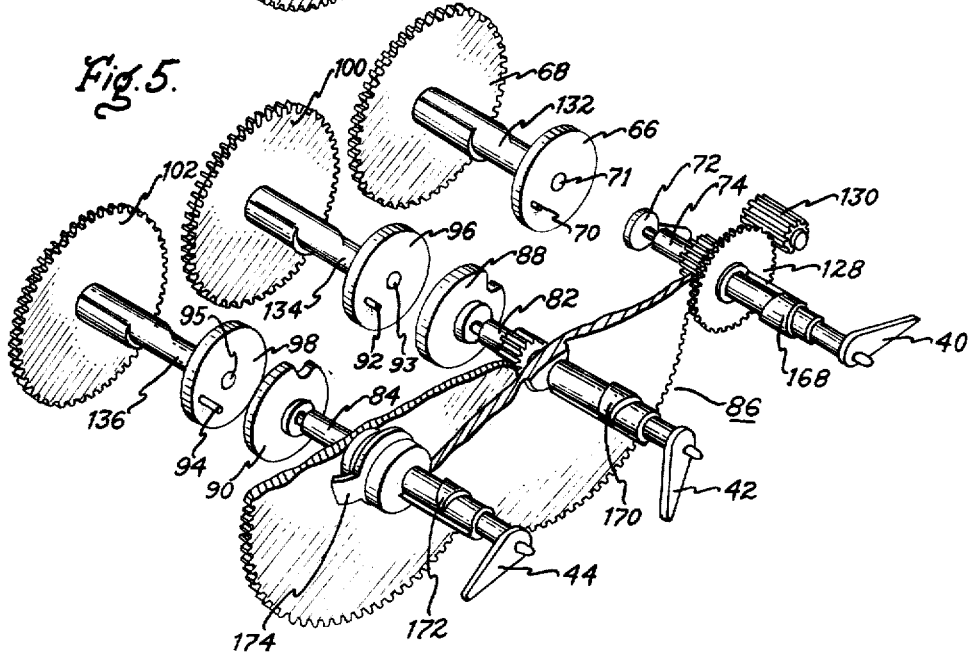

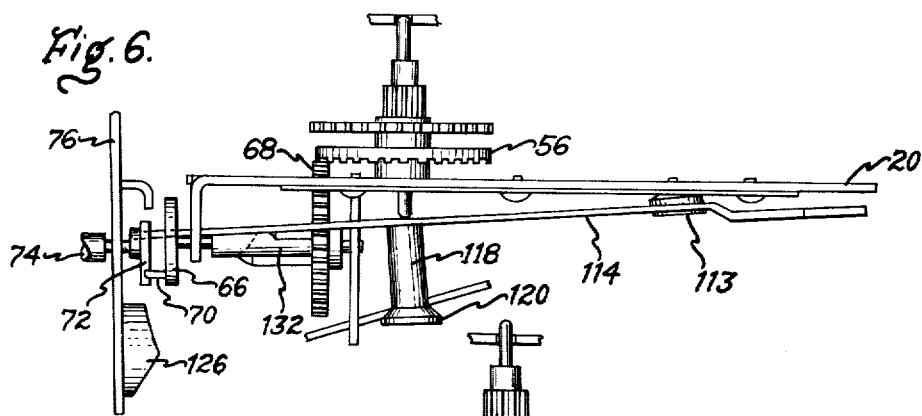
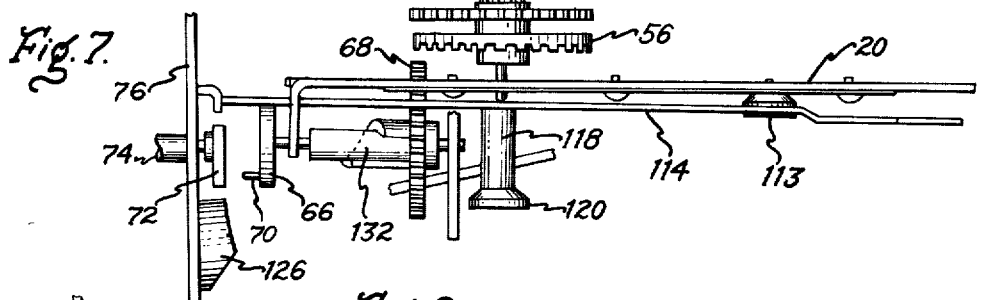
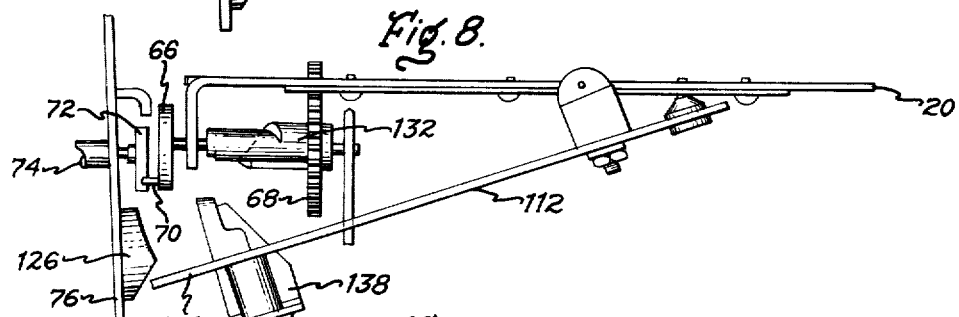
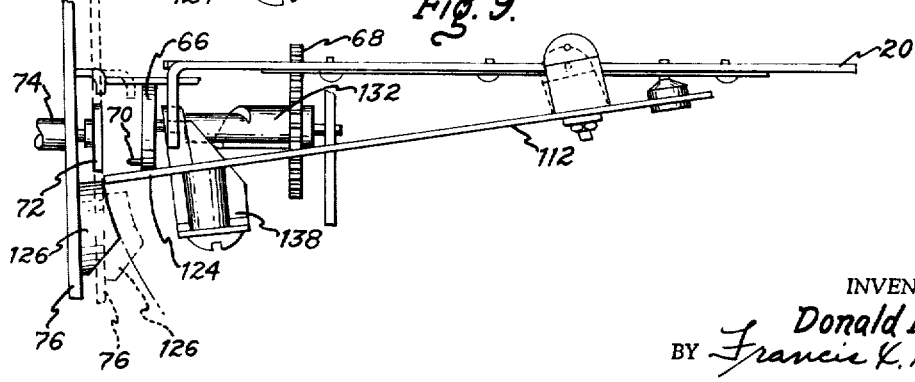

June 4, 1963 D. M. HAM 3,092,318
INDICATING DEMAND METER
Filed Nov. 23, 1960 8 Sheets-Sheet 5

INVENTOR.
Donald M. Ham,
BY Francis X. Doyle
His Attorney.

June 4, 1963
D. M. HAM
3,092,318
INDICATING DEMAND METER
Filed Nov. 23, 1960
8 Sheets-Sheet 6
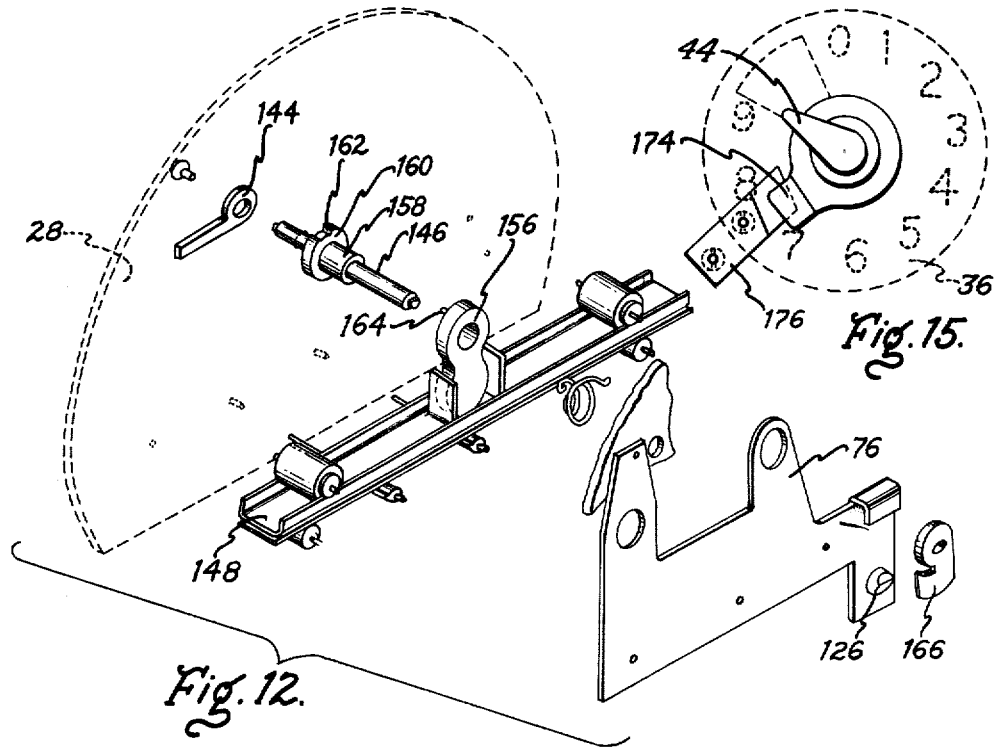
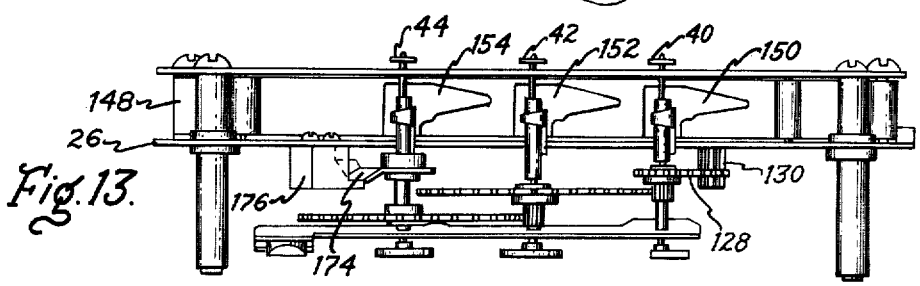
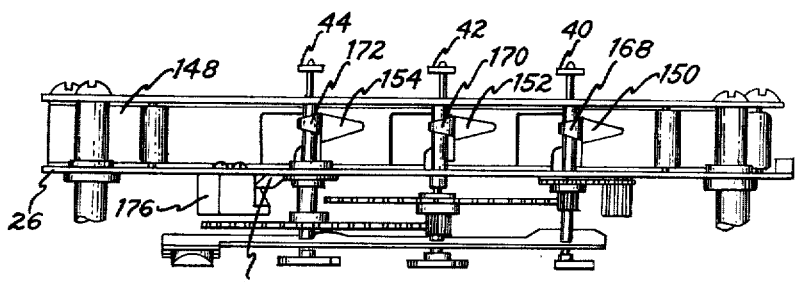
INVENTOR.
Donald M. Ham,
BY Francis K. Doyle
His Attorney.

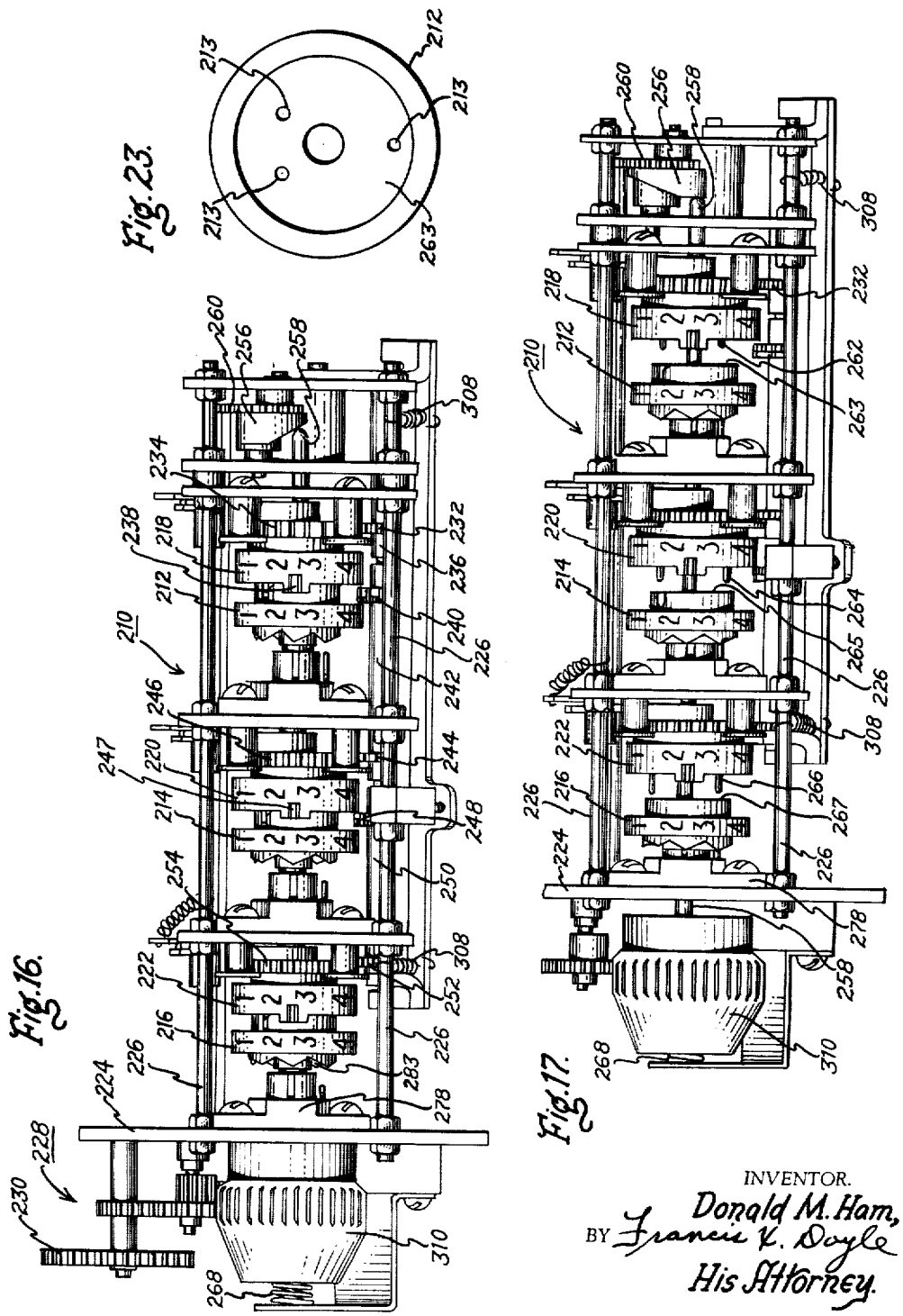

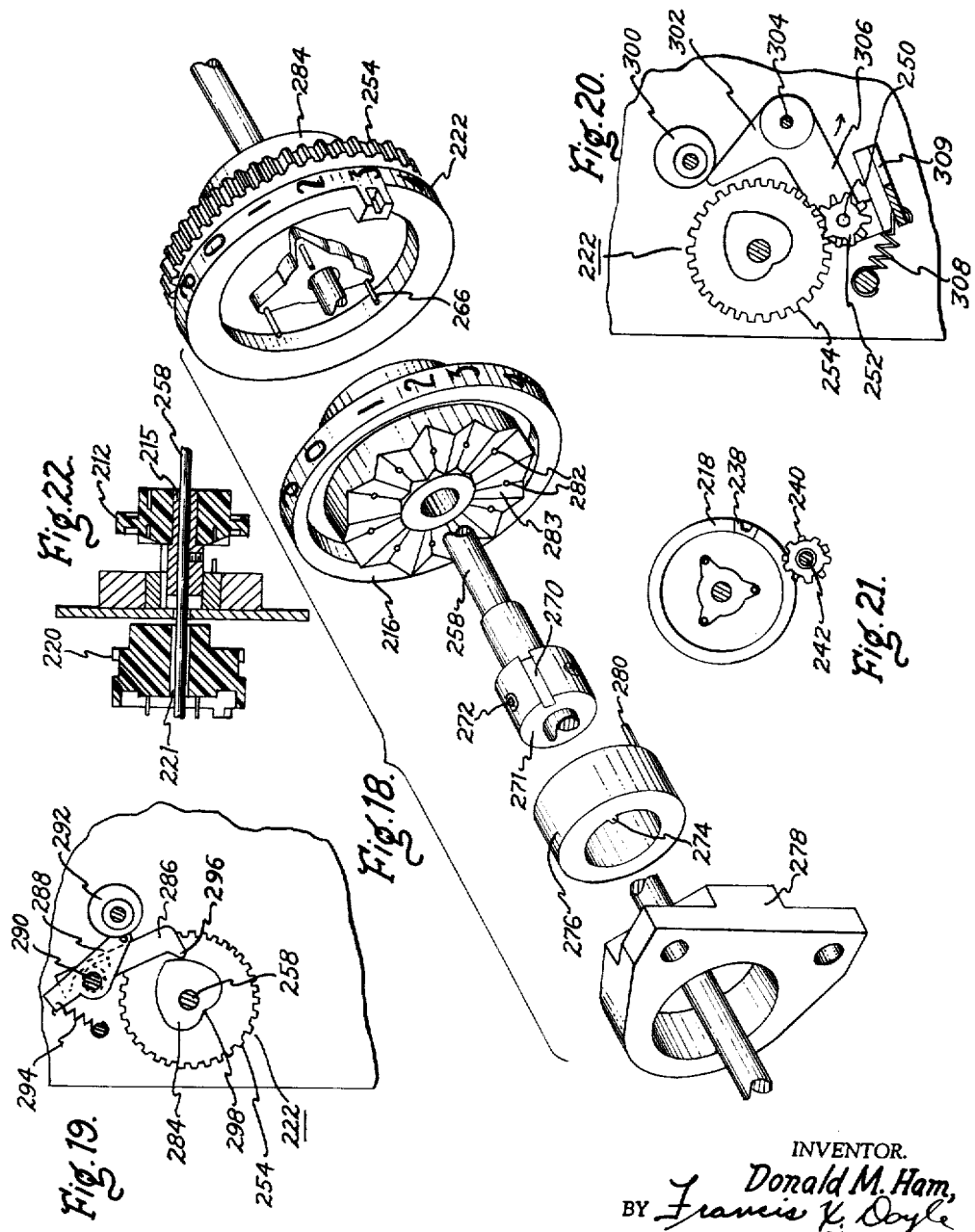

United States Patent Office 3,092,318
Patented June 4, 1963

3,092,318
INDICATING DEMAND METER
Donald M. Ham, Rochester, N.H., assignor to General
Electric Company, a corporation of New York
Filed Nov. 23, 1960, Ser. No. 71,353
16 Claims. (Cl. 235—104)

This invention relates to an indicating demand meter and more particularly to a demand meter which is provided with an indicator register utilizing a plurality of dials for registering the maximum demand.

As is well-known to those skilled in the metering art, the concept of demand is associated with the metering of electrical energy and has been derived in an effort to equitably recover the capital costs of equipment. Electrical generating and distributing equipment which is installed by utilities must be capable of handling the peak loads which may occur from the total requirements of the utilities customers. However, such equipment in general will have greater capacity than is normally required by the customers. To recover the cost of this equipment various known demand devices measure the peaking effects of the individual customer installations by determining the average of the real power required by the customer over specified time intervals. Those customers who have a high peak demand during such time intervals in comparison to their average load, are required to pay an added charge based upon this peak demand as their share of the cost of the increased capacity required to be maintained by the utility. In the general field of the demand metering art, the demand devices are utilized to obtain quantitative information relative to time. Therefore, such devices require a link to be periodically returned to zero. The most common type of demand device is termed the indicating demand register, whose indication is for a single, maximum demand that has occurred during a given billing period.

The usual indicating demand meter presently used in the art is, in general, a single dial scale which utilizes a long scale with a single pointer. These indicating meters are characterized by the trace of the indicator pusher which is made to advance over a fixed continuous path so that a negative change in magnitude causes the pusher to retrace its original path in the reverse direction. In retracing, the indicator pusher leaves the indicator at the point of maximum advance. However, as is well-known by those skilled in the meter art, the limitations of this single dial or fixed sector type design has prevented the use of a single scale for the many demand metering applications. It is necessary for the demand register user to have some idea of the particular operating level of his installation before purchasing a demand register. For all practical purposes, each installation requires a custom fitting. For example, a demand meter which is calibrated in units satisfactory for a 600% load, naturally would not be satisfactory for one utilizing a 100% load. As a result of this problem, industry standards have been established to reduce the amount of custom fitting required. These standardized demand register class designations have been used to indicate the particular operating level of the meter's nominal rating for which the given register is applicable. Classes which are presently in existence, and the percentage of the kilowatt hour meter's nominal rating for which they are suitable are as follows:

| | Percent |
|---|---|
| Class I | 166⅔ |
| Class II | 333⅓ |
| Class IV | 500 |
| Class VI | 666⅔ |

Of course, in addition to having to select the correct class for the anticipated use, it is necessary to select a particular scale calibration through each variation of the watt hour register ratio. Both the manufacturer and the customer have to abide with this complex situation because in the present demand register art, it is the best answer found to these metering problems.

From the above, it will be obvious that a demand register which would be accurate over the entire operating range of the present day extended range meters and which would not require a great variety of scale markings is a long-felt need in this metering art. The demand register to meet such needs should eliminate the necessity of classes with the various problems of fixed scales; it should also eliminate the many different scale calibrations which are presently required. Further, it should be able to provide a precise indication of all loads greater than present day practice, and should require a minimum of calibration and testing.

Of course, a clear answer to the numerous problems set forth above would be to provide an indicating demand meter which utilizes a multiple dial scale in the fashion of a standard kilowatt hour meter. However, the pusher a multi-dial indicator follows a path which overlaps itself for every revolution of the first dial, and while it could be reset to zero without adversely affecting the indicated value, the distance which was traversed in the reverse direction toward zero would, in general, only be a fractional part of the total forward travel. Thus, the pusher, in going forward would contact the indicator on the next advance after traverving only a small distance Obviously, such a device would not be a maximum demand indicator, because the pusher would be making contact with the register indicator before traversing the distance taken by the indicator in reaching the previously recorded maximum position. From this, it is obvious that in order to utilize a multiple dial scale similar to the standard kilowatt hour register, the demand register must be provided with a pusher which would always traverse a distance from zero which is equal to the existing maximum recorded on the scale before contacting the indicator again. As is well-known, such problem is not found in the single scale maximum demand meters inasmuch as the maximum demand indicator only covers a sector of the circle. Therefore, the pointer pusher never goes beyond an angle which is less than 360°. However, in the multiple scale device, the angles of shaft rotation would be greater than 360° as the various dials were turned to indicate the demand. Thus the problem which is necessary to be solved in this field is the sensing of angles of shaft rotation greater than 360°.

Thus, it is an object of this invention to provide a maximum demand indicating meter utilizing a multiple dial scale which will truly indicate the maximum demand registered thereon.

Another object of this invention is to provide a maximum demand indicating meter which will utilize only a single meter for all types of demand problems, thereby eliminating the necessity of various classes of demand meters.

It is a further object of this invention to provide a maximum demand indicating meter in which the meter is provided with a number of dials to provide an indication of maximum demand, thereby providing a precision of demand indication greater than that obtainable in the present art.

It is another object of this invention to provide a multi-dial indicating device in which each dial indicator is driven by a separate shaft means and in which shaft driving means are provided which may be decoupled from such shaft means and which will not be recoupled until the shaft driving means have returned to the same position they were in when decoupled.

In carrying out this invention in one form a maximum demand meter is provided which comprises a maximum demand indicating means, a driving means driven in accordance with a demand to be measured in successive demand intervals and a predetermined clutch means which couples the drive means to the indicating means whenever the drive means is driven, in a succeeding demand interval, to a demand which equals the demand presently indicated by the indicating means.

While the subject matter which is regarded as the invention herein will be pointed out and distinctly claimed in the claims appended hereto, it is believed that this invention, as well as the manner in which its various objects are obtained, as well as other objects and advantages thereof, will be better understood from the following description taken in connection with the accompanying drawings in which:

FIGURE 1 is a side view, in elevation, showing the various portions of a demand register made according to one form of this invention;

FIGURE 2 is a bottom view of the driving mechanism of one form of a demand register according to this invention, the view being taken substantially along the line 2—2 in FIGURE 1;

FIGURE 3 is a front view of the demand register according to this invention and also showing a standard kilowatt hour register with the demand register;

FIGURE 4 is a perspective view of the mechanical coincident connection between the driving means and the recording register of a demand register made according to one form of this invention;

FIGURE 5 is a view similar to FIGURE 4 but showing the mechanical circuit between the driving means and the recording register in its disconnected position;

FIGURES 6–9 are elevation views of a portion of one form of the automatic interval reset mechanism of the demand register of this invention, FIGURES 6 and 8 showing the normal position of such mechanism during a demand interval, while FIGURES 7 and 9 show the position of the mechanism during reset;

FIGURE 12 is an exploded view of a portion of the manual monthly reset mechanism according to one form of this invention;

FIGURE 13 is a bottom view of a portion of the manual monthly reset mechanism according to one form of this invention, the mechanism being shown in its normal position;

FIGURE 14 is a bottom view of a portion of a manual monthly reset mechanism, similar to FIGURE 13, showing the mechanism during reset;

FIGURE 15 is a front view of one form of automatic declutching means as used on the highest register dial;

FIGURE 16 is a front view, with casing removed, of a second form of demand register according to this invention;

FIGURE 17 is a front view of a second form of demand register similar to FIGURE 16, but showing the parts in resetting position;

FIGURE 18 is an exploded view of one of the indicators used in this form of the invention;

FIGURE 19 is a fragmentary view of a portion of the demand meter showing the device for resetting the driven wheels;

FIGURE 20 is a fragmentary view of another portion of the demand meter showing the device used to disengage the driven wheels from the driving gear;

FIGURE 21 is a fragmentary view of a driving wheel and a pinion driven thereby;

FIGURE 22 is a sectional view showing the manner of mounting the driving wheel and the register wheel; and FIGURE 23 is an end view of one of the register wheels.

Figure 10:
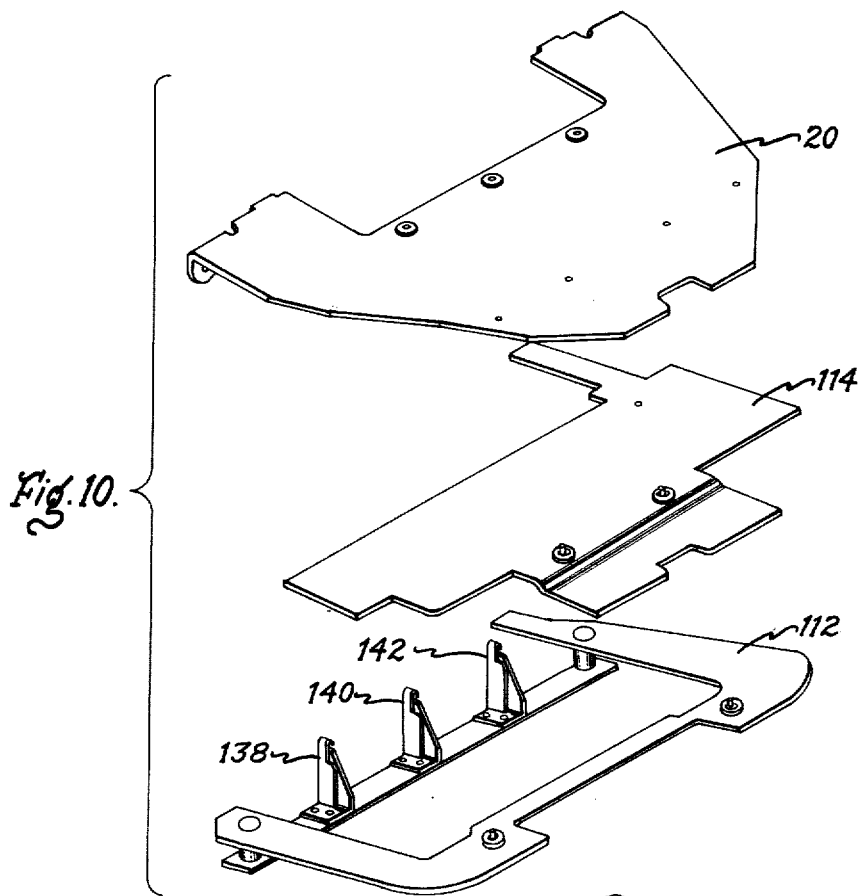
FIGURE 10 is an exploded view of a portion of one form of the automatic interval reset mechanism.

Referring now to the drawings, wherein like numerals are used to indicate like parts throughout, and in particular with reference to FIG. 1, there is shown a side elevation view of one form of a demand register according to this invention. The maximum demand meter or register 10 shown in FIG. 1 comprises the maximum demand indicating or counting 12 means which is driven by a driving means 14 in accordance with a demand which is to be measured or counted. The meter or register 10 is provided with clutching means, generally indicated at 16, for coupling the driving means to the indicating means. The clutching means 16 is designed so that the driving means will drive the indicating means through a given demand interval and then will be declutched at the end of such interval. Upon releasing the clutch means, the driving means will not mesh with, or be coupled to, the indicating means until the driving means has been driven to a demand position which equals the demand which is indicated by the indicating means. The clutch means 16 can thus be considered a predetermined clutch means since it only acts to re-couple the driving means and the indicating means at a predetermined position, the position of the indicating means when it was uncoupled.

As shown in FIG. 1 the maximum demand meter comprises a pair of parallel horizontal support plates 18 and 20 which are fixedly spaced from each other, such as, for example, by being connected to each other by means of spacers 22, only one of which is shown. At the forward end of such spaced horizontal plates 18 and 20 is provided a fixed vertical plate 24. Connected to the vertical plate 24 are a pair of fixed spaced parallel vertical front plates 26 and 28, the plates 26 and 28 being connected to and spaced from the fixed plate 24 as by means of spacers 30, only one of which is shown in this view. Plates 26 and 28 are spaced from each other by means such as spacers 27. The outermost plate 28 has the various dials printed thereon which are utilized for recording both the maximum demand indication and the kilowatt hour indication. This can more clearly be seen by reference to FIG. 3 where the maximum demand indicating means 12 is shown as 3 dials, 32, 34, and 36, the dial 32 being generally designated the units dial, dial 34 the tens dial, and dial 36, the 100's dial. As will be understood, these dials are usually printed on the front plate 28. Also shown on the front plate 28 are the dials, generally numbered 38, which are utilized for registering the kilowatt hour consumption of power in the manner well-understood by those skilled in the art. Of course these dials cooperate with the conventional register pointers, 40, 42, and 44 respectively for the demand dials, and pointers 46 for the kilowatt hour dials to indicate the maximum demand and the kilowatt hour usage. As will be understood, these pointers 40, 42 and 44 are the indicating members or the counting members of the register 10.

Referring again to FIG. 1, there is shown journaled between the fixed horizontal plates 18 and 20 the driving means 14 in the form of a gear train, the gear 48 being utilized to take off from a meter disk (not shown) the meter revolutions and drive both the kilowatt hour and the maximum demand register. In general the gear 48 would mesh with a pinion (not shown) secured to the meter disk shaft in order to take off from such meter the desired disk revolution. Obviously, suitable means, as will be well-understood, will be provided to mount the register on the meter such that the proper mesh is obtained between gear 48 and the pinion of the meter disk shaft to provide the desired registration on both the maximum demand register and the kilowatt hour register.

The manner of mounting the register on the meter is believed to be well-understood by those skilled in the art and, inasmuch as it forms no part of this invention, it is not shown in the drawing and will not be described further.

A conventional kilowatt hour register mechanism indicated as 50 is utilized for driving the register pointers 46 of the kilowatt hour register. This mechanism is journaled between the vertical plates 26 and 28, in the upper portion thereof, as shown in FIG. 1, and is provided with a driving means from the gear train 14 through gear members 52 and 54. Again, inasmuch as the kilowatt hour register forms no part of this invention and since such driving mechanisms are well understood by those skilled in the art, no further description will be made of this portion of the meter.

Considering now FIG. 2, which is a bottom view of the driving mechanism of the demand register, there is shown the driving mechanism of the demand register comprising a series of crown gear 46, 58, and 60 which are rotatably mounted between the fixed horizontal plates 18 and 20, plate 20 only being shown in FIG. 2. The crown gears 56, 58, and 60 form a part of a gear reduction mechanism 62 which meshes with the gear train 14 to provide the driving means for indicating the total number of demand impulses counted by the mechanism. As shown in FIG. 2 crown gear 56 meshes with gear 64 of the gear train 14, and the gear train 14 is so designed that the crown gear 56 will rotate in proportion to the total number of demand impulses which are to be counted by the mechanism. The gear reduction mechanism 62 is coupled to the demand indicating register 12 by means of a novel mechanical coincidence circuit which will be further described hereafter.

Considering now FIGS. 1, 2, and 4, it can be seen that the crown gear 56 drives a disk means 66 through a gear 68. The disk 66 is provided with a pin 70 which rotates with the disk 66 to perform a driving function somewhat in the nature of a crank. As can be clearly seen in FIG. 2 disk 66 is rotatably mounted in front of the vertical plate 24, pin 70 on disk 66 drives a dog 72 which is mounted on the unit pointer shaft 74. Of course, the unit pointer shaft 74 drives the unit pointer 40 about the unit dial 32 as will be well-understood. Unit pointer shaft 74 is journaled at its outer end in the front dial plate 28 and at its inner end to a pivotally mounted vertical plate 76 which lies between the vertical plates 24 and 26. The plate 76 is pivotally mounted in any desired manner. For example, as is indicated at 78 in FIG. 1, to a fixed post 80 which is fixed to the vertical plate 26. It will of course be understood that openings are provided in the plate 26 such that the pointer shaft 74 and the other shafts may pass through the vertical plate to be journaled on the front vertical plate 28.

As shown in FIG. 2, the dog 72, which is affixed to the unit shaft 74, is mounted behind the pivoted plate 76 and is there engaged by the pin 70 on the driven disk 66 as hereinbefore described. The tens shaft 82 and the hundreds shaft 84 are journaled in a similar manner in the front dial plate 28 and in the pivotally mounted vertical plate 76. However, as will be well understood these shafts are driven from the unit shaft through a gear reduction mechanism generally indicated as 86 (see FIG. 4). Each of shafts 82 and 84 is provided with a slotted disk 88 and 90, respectively, as is clearly shown in FIGS. 4 and 5 of the drawing. Each of the slotted disks 88 and 90 are slotted so as to accommodate the pins 92 and 94, respectively, which are mounted on disk 96 and 98, respectively. The disks 96 and 98 are driven by the crown gears 58 and 60 respectively, through gears 100 and 102, respectively. As hereinbefore pointed out, the tens pointer 42 and the hundreds pointer 44 are driven by the units shaft 74 through the gear reduction mechanism 86. The pins and slotted disks are not utilized as driving mechanisms but are used as the basis of one form of the mechanical coincident circuit which is utilized in the arrangement shown in FIGS. 4 and 5. When the demand register indicates 000, the slotted disks 88 and 90 will track with the pins 92 and 94 as the register counts the demand up from 0. However, the disks will not be driven by the pins since the gearing ratio between the driving crown gear 56 and the gears 58 and 60 is similar to the driving mechanism between the units shaft 74 and the tens and hundreds shafts 82 and 84 respectively, such that the pins 92 and 94 will ride in the slotted disks 88 and 90 but will not drive such disks. The pivoted plate 76 is provided with a biasing spring 104 (see FIG. 1) which biases the plate such that the pin 70 can drive dog 72 to rotate the unit shaft of the demand register. From the above it can be seen that disk 66 and pin 70, disk 96 and pin 92, and disk 98 and pin 94 are, in effect, a counting register, similar to the dials 32, 34, 36 and their pointers 40, 42 and 44, respectively.

The demand register of this invention incorporates an interval resetting means which is automatically actuated at either a 15–30 or 60 minute interval, as desired. The actuating means of the automatic interval resetting means may take the form of a timing mechanism 106, shown in FIG. 1, which operates at the desired interval to initiate an interval resetting action through a link or lever 108 which may be caused to oscillate about a pivot point. One end of the lever 108 is coupled by means of a link 110 to a first pivotally mounted horizontal plate 112 which lies beneath the lower fixed horizontal plate 20 as is clearly shown in FIG. 1 of the drawing. Lying between the pivotally mounted horizontal plate 112 and the bottom plate 20, is a second pivotally mounted horizontal plate 114 which has provided a biasing spring 116 which biases the plate upward toward the fixed bottom plate 20. Both plate 112 and 114 are pivoted at the same point on plate 20 by any desired means, as indicated by pivot point 113. Depending from the plate 114 is a pin 118 which has an enlarged head 120 which extends through an opening in the first pivoted plate 112. The opening in the pivoted plate 112 is not sufficiently large to extend around the enlarged head 120. Therefore, plate 112 engages head 120 and pulls the plate 114 downwardly against the biasing action of the spring 116. The plate 112 is biased downwardly by means of gravity and is normally in its downward position. The plate 112 is raised by means of link 110 when the lever 108 is oscillated by means of the timing mechanism 106. As seen in FIG. 1, the lever 110 is connected to plate 112 by means of a tab 122 which is fixedly mounted to the plate 112. During the resetting action of the timing mechanism 106, the lever 110 lifts plate 112 from its downward position thereby releasing the pull on plate 114 through the pin 118.

Reference will now be made to FIGS. 6 and 7, which shows the normal position and the interval reset position of plate 114. In its normal position, the plate 114 is pulled down by plate 112 and one end of the shafts of the crown gears 56, 58, and 60 rest on the plate 114, allowing the crown gears to engage the gears 68, 100, and 102, respectively. Only gears 56 and 68 are shown in FIGS. 6 and 7. When the interval resetting is initiated, the lower pivoted plate 112 is pulled upwardly, thereby freeing the second pivoted plate 114 allowing it to move upwardly under the urging of the biasing spring 116. As the horizontal plate 114 moves upwardly, it picks up the crown gears and lifts the crown gears out of engagement with the gears 68, 100, and 102. The drive mechanism of the demand register is thus disengaged.

Referring now to FIGS. 8 and 9, for a further indication of the action of the interval resetting mechanism, the plate 112 is shown as being provided with an extension 124. As the plate 112 is lifted in its upward direction, by action of the lever 110, the extension 124 cooperates with a cam 126 on the pivoted vertical plate 76 to pivot this plate in a forward direction. It carries with it the pointer shafts 74, 82 and 84, only shaft 74 being shown in the drawing, and thereby carries the dog 72 and the slotted disks 88 and 90 therewith. Thus the dog 72 and the slotted disks 88 and 90 become disengaged from the driving pin 70 and the tracking pins 92 and 94. The disengaged position of these parts is clearly shown in FIG. 5. This action is clearly shown in FIGS. 8 and 9, where FIG. 8 shows the extension 124 of plate 112 prior to its engagement with the cam 126 on the pivoted plate 76. In FIG. 9, the extension 124 is shown as having engaged cam 126 and thereby has moved the pivoted plate 76 to the full line position shown in FIG. 9, where it can be seen that the dog 72 and the driving pin 70 have disconnected. The dotted line position of the plate 76 shown in FIG. 9 is the normal position of plate 76 during the recording demand interval. Thus, it can be seen that at the initiation of the interval resetting mechanism, the crown gears 56, 58 and 60 are disengaged from the gears 68, 100, and 102 respectively, thus disengaging the drive to the demand register. At the same time the driving pin 70 and the tracking pins 92 and 94 are disengaged from the dog 72 and the slotted disks 88 and 90. In this manner, the driving pin 70 and the tracking pins 92 and 94 may be reset to the zero position while the indicating register of the meter retains the maximum demand which has already been recorded thereon.

In order to lock the demand pointers 40, 42, and 44 in the recorded maximum demand position during the resetting interval, the unit shaft 74 is provided with a gear 128 (see FIGS. 4 and 5). The gear 128 is mounted on the unit shaft 74 by means of a spring and groove arrangement (not shown) such that it will provide a friction clutching to the unit shaft during the interval resetting. The gear 128 is meshed with a lock pinion 130 which may be mounted on one of the vertical plates 26 or 28 as desired. Of course, inasmuch as the movement of the unit shaft 74 provides the desired driving through the gearing mechanism 86 to the tens shaft 82 and the hundreds shaft 84 the locking of the unit shaft 74 will provide a desired locking of the tens and hundreds shafts 82 and 84 respectively.

Figure 11:
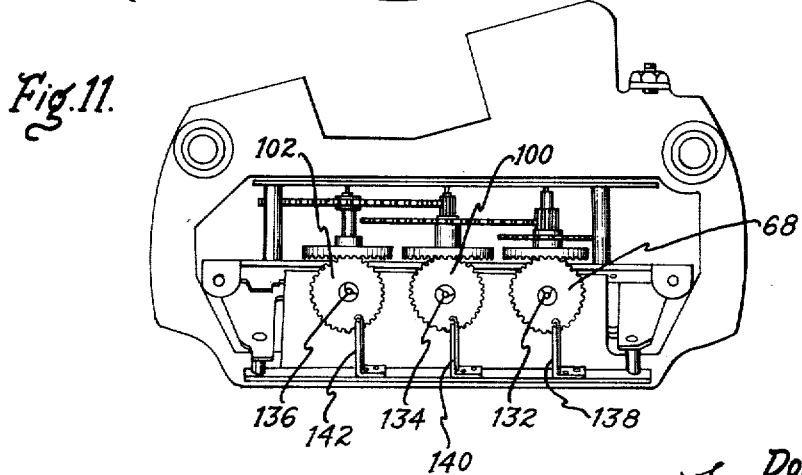
FIGURE 11 is a front view of a portion of the automatic interval reset mechanism.

In order to provide the desired resetting of the driving pin 70, and the tracking pins 92 and 94, during the automatic interval reset, the shafts 71, 93 and 95 which carry the driving pin 70 and the tracking pins 92 and 94 respectively, are provided with identical phased gears 132, 134, 136, respectively, as shown in FIGS. 4 and 5 of the drawing. These phased gears are in the form of a wraparound helix which is wrapped about the different shafts. The pivoted horizontal plate 112 is provided with three upwardly extending wedge members 138, 140, and 142 as is shown in FIGS. 10 and 11 of the drawing. These wedge members cooperate with the phased gears to reset the shafts such that the driving pin and tracking pins will be returned to their zero position as the plate 112 moves through its pivotal motion during the automatic resetting interval. As can be seen more particularly in FIGS. 8 and 9 of the drawing, as FIG. 112 is lifted in its upward position, the wedge shaped member 138, which can be considered as a rack, engages the phased gear 132 and causes the phased gear to rotate shaft 71 and with it the gear 68, the disk 66 and driving pin 70 until it returns to its zero position. As will be seen, especially from FIG. 11 of the drawing, each of the wedge shaped members 140, 142 cooperate in a similar manner with the phased gears 134, 136 respectively, to cause the resetting of the tracking pins 92 and 94 to their zero position. Phased gears in general are more fully described and claimed in application Serial No. 71,267, filed November 23, 1960, now Patent number 3,075,399 issued January 29, 1963, in the name of the present inventor for "Gear Assemblies Having Phased Tooth Displacement" and assigned to the same assignee as this invention.

At the end of the interval resetting motion, the plate 112 returns to its lower-most position and in so doing pulls down the pivoted plate 114 thereby allowing the crown gears 56, 58, and 60 to again mesh with their respective gears 68, 100, 102. Also the extension 124 of plate 112 clears the cam 126 thereby allowing the vertically pivoted plate 76 to return to its normal position under the urging of the biasing spring 104. However, since the slotted disks 88 and 90 have remained in the position that they occupied when the pointer register was disengaged from the driving pin and the tracking pins, the slots in the tens disk 88 and the hundreds disk 90 will not coincide with the cooperating tracking pins 92 and 94.

As will be noted in FIG. 5, the hundreds pin 94 is longer than the tens pin 92 and the tens pin 92, in turn, is longer than the driving pin 70 on the unit driving disk 66. Therefore, when the vertical plate 76 moves back toward its normal position, the pin 94, cooperating with the slotted disk 90, will engage the flat part of the disk. This will hold the pivoted vertical plate 76 away from the normal position a sufficient amount to allow driving clearance between the driving pin 70 and the dog 72. In this manner, the reading of the demand register will be retained for the next interval and will not be changed unless the demand in one of the succeeding intervals exceeds the reading presently on the demand register. Of course, the crown gears and the associated driving gears will rotate as before and will actually count the demand impulses. But these impulses will not be recorded on the demand register. However, should the present demand exceed the reading on the demand register, then the various pins will coincide with their slots in the slotted disk and will allow the driving pin 70 to again engage the dog 72 and drive the demand register to record the increase in demand during the interval.

The operation of this unique mechanical coincidence circuit can be readily visualized referring specifically to FIGURE 5 of the drawing and assuming, for purpose of this discussion, that the pointers of the demand register indicate a figure such as 853. The crown gears 56, 58 and 60 will, through gears 68, 100 and 102, drive the disk 66 and its pin 70, as well as disk 96 and pin 92, and disk 98 and pin 94, until such time as a total of 800 impulses have been counted. The hundreds driving pin 94 will have rotated around until it will readily slip into the slot on the hundreds disk 90. With the pin 94 having slipped into the slot in disk 90, the vertical pivot plate 76 will move closer and the tracking pin 92 will then be brought in contact with the flat portion of the tens disk 88. Then as the crown gear assembly drives through the 850 impulse mark, the tens tracking pin 92 will slip into the slot in the disk 88 thereby allowing the vertical pivoted plate 76 to move all the way back to its normal position where the driving pin 70 will be able to contact the dog 72 on the unit shaft 74. Now, as the impulses counted reach 853, the driving pin 70 will contact the dog 72 and thereafter any further impulses beyond the 853 point which are counted by the crown gear assembly will be recorded on the demand register since the driving pin 70 will drive the dog 72 and cause the various pointers to be driven to the new maximum demand indication. Of course, it will be obvious that after the completion of this interval, the interval resetting mechanism will again operate to reset the driving and tracking pins to the zero position again, leaving the new reading on the demand register. The interval resetting action and the interval recording will continue throughout the set period, generally one month, until such time as the reading of the demand register is taken and the demand register is returned to zero indication at the time of resetting at the end of the monthly interval.

Monthly resetting of the demand register is provided in a manner which will now be discussed. Referring now to FIGURE 12, there is shown a crank member 144 which extends beyond the front plate 28 as can be more clearly seen by reference to FIGURE 1 and FIGURE 3. This monthly resetting crank 144 is fixedly attached to a shaft 146 which extends through plate 28 and plate 76 as indicated in the exploded view of FIGURE 12. Mounted behind the plate 28 is a rack member 148 which is provided with cooperating cams 150, 152, and 154, as is more clearly shown in FIGURE 13. In the embodiment shown the cams 150, 152, 154 are shown in the form of slots in the base of rack 148. The rack 148 is caused to reciprocate by movement of the crank member 144 at monthly reset. This reciprocation is provided by means of a pivotal member 156 which is mounted in rack 148 as shown in FIGURE 12 and is rotatably mounted on a collar 158 fixedly attached to the shaft 146. Collar 158 is provided with a disk member 160 having a slot 162 therein. The slot 162 receiving the pin 164 of the pivotal member 156. Fixed to the back end of the shaft 146 is a cam member 166 which cooperates with the cam 126 on pivotal plate 76 to move the plate 76 in a forward direction to disengage the driving pin 70 and the tracking pins 92 and 94 from the dog 72 and the slotted disks 88 and 90, respectively. In the same manner as hereinbefore set forth with reference to the automatic interval resetting mechanism. The slot 162 and the pin 164 cooperate to provide a lost motion connection between the crank 144 and the rack 148 such that the first movement of the crank 144 will pivot the plate 76 in its forward direction to disengage the driving and tracking pins before the resetting of the demand register takes place. After the lost motion has been taken up between the pin 164 and slot 162 further movement of the crank 144 will cause the rack 148 to reciprocate in a direction to cause the resetting of the demand register.

To reset the demand register, each of the dial shafts of the demand register is provided with a phased gear 168, 170, 172 as shown in FIGURES 13 and 14. These phased gears are also clearly shown in FIGURES 4 and 5 of the drawing. As the rack member 148 begins to move or slide, the cam members 150, 152 and 154 engage the phased gears 172, 170, and 168 respectively, to move the dial pointers 40, 42, and 44 respectively, back to their zero positions. Of course, movement of the dial pointers to their zero positions at the same time returns the dog 72 and the slotted disk 88 and 90 also to their zero positions. It will be understood that the gears which comprise the gear train 86 are mounted on their respective shafts with a spring and groove arrangement (not shown) in the same manner as the gear 128 is mounted on the shaft 74 such that the resetting may occur by causing the shaft to slip through the clutched gears.

After the pointers 40, 42 and 44 have been reset to their zero position the crank member 144 is moved back to its original position. Movement of the crank 144 returns the rack 148 back to its original position, as shown in FIG. 13, to allow the pointers to again count demand, without any interference between the phased gears 168, 170 and 172 and the rack 148. This return of crank 144 also moves cam 166 out of engagement with cam 126, allowing plate 76 to return toward its normal position. It will be understood that the follower pins 92 and 94 may slip into the slots on disks 88 and 90, or may butt against the faces of these disks, depending on the position of the pins at the time of monthly reset. Should the pins 92 and 94 be in other than their zero position, then no demand will be registered during that portion of the automatic interval since the disks 88 and 90 will be in the zero position. However, at the next automatic interval reset, the pins will be returned to the zero position, as explained hereinbefore, and will then coincide with the slots in disks 88 and 90. Thus, at least at the beginning of the first automatic interval after monthly reset, the demand register will begin to register the actual demand use of the consumer.

The demand register of this invention is also provided with a means to limit the demand register to the highest possible reading, in the present example, with three dials, the highest reading will be 999. This is done to prevent an erroneous demand reading being recorded for a given demand interval in the event that the customer should actually utilize in a given demand interval more power than the highest demand which can be recorded by the demand register. The mechanism for preserving this highest reading is shown in FIGURES 13, 14 and 15 and takes the form of a camming device 174 which is mounted on the hundreds shaft. This camming device 174 cooperates with a fixed cam 176 which is mounted on the fixed horizontal plate 26 as is clearly shown in FIGURES 13 and 14. In this manner, as will be readily apparent, when the hundreds shaft is turned to the 999 registration, the cam 174 will engage the sloping side of the fixed cam 176 to pull a portion of the demand register forward by pivoting the pivoted plate 76. A registration of 999 demand impulses will disengage the dog 72 from its driving pin 70, as well as disengaging the sloted disks 88 and 90 from their tracking pins 92 and 94, respectively. Thus, when the demand register records the highest possible reading, in this instance a reading of 999, the driving connection will be disengaged and no further impulses will be recorded on the demand register.

Referring now to FIGURES 16 through 23 there is shown a second embodiment of the indicating demand meter of this invention in which a cyclometer indicator is used, rather than the indicating dials which are described in the first embodiment of this invention. Considering specifically FIGS. 16 and 17, this embodiment of the invention is shown as an indicating demand meter 210, which comprises a cyclometer register having the registering cyclometer wheels 212, 214 and 216, which register the unit value, tens value and hundreds value respectively, of the electrical energy which is used during a given demand interval. In this embodiment of the invention the indicating means or the counting members are the cyclometer wheels 212, 214 and 216. The register cyclometer wheels 212, 214 and 216 are driven by the driving wheels 218, 220 and 222, respectively, with the driving wheels being driven in a manner which will be more fully described hereafter. The cyclometer register is mounted within a casing (not shown), with the various segments of the cyclometer register being spaced from a main base plate, 224, by means of the spacer arms, generally indicated as 226. A gear train, generally indicated as 228, is connected through gear 230 to be driven by the take-off from the meter disk (not shown) to drive the indicating demand register in accordance with the meter revolutions, as is well known to those skilled in this art. By means of the gear train, 228, the unit wheel, 212, is driven through the driving wheel, 218, in a step manner so as to indicate each unit of energy which is utilized during a given demand interval. As is well understood by those skilled in this art, the driving mechanism may utilize a well-known Geneva mechanism (not shown) so as to provide a stepped rotation of gear 232, which meshes with gear 234, permanently attached to the driving wheel 218, so as to rotate driving wheel 218 in ten steps. Driving wheel 218 will drive register wheel 212 one step for each unit of electrical energy used, for example, one step for each kilowatt hour. As shown in FIGURE 16, the unit wheel 212 is connected to the driving wheel 218 such that the unit wheel 212 will be driven in synchronism with the wheel 218. Thus, the register wheel 212 will indicate the actual usage of electrical energy, for example, in kilowatt hours, during a given demand interval.

FIGURE 16 shows the indicating demand register of this embodiment with the driven register wheels 212, 214, and 216 being coupled in driving relation to the driving wheels 218, 220, 222, respectively, so as to be driven thereby. FIGURE 17 shows the cyclometer register of this embodiment during the interval resetting period, when the register wheels 212, 214, and 216 are out of engagement with their driving wheels 218, 220, 222, respectively. Thus, in the cyclometer register of this embodiment there is provided a clutching means which will couple the driving wheels 218, 220 and 222 to the register wheels 212, 214, and 216, respectively, such that the driving wheels will drive the registering wheels through a given demand interval. At the end of this interval, in a manner to be hereinafter described, the driving wheels 218, 220, 222 will be declutched from the registering wheels 212, 214, 216, respectively, the driving wheels will be reset to a zero position, and the clutch means will then be released so as to return the wheels to their clutching position. However, due to the novel feature of the clutching device herein disclosed, the driving wheels will not be coupled to the register wheels until the driving wheels have been driven to a demand position which will equal the demand which is already registered on the register wheels.

As heretofore noted, the gear device 232, which is mounted on the rotatable pinion 236, is driven intermittently in accordance with each unit of electrical energy used during a given demand interval, such as, for example, one kilowatt hour. The gear 232 meshes with gear 234 on the driving wheel 218 so as to drive the wheel and, when in its coupled position as shown in FIGURE 16, the register wheel 212, to provide an indication of the kilowatt hours which are used during a given demand interval. Driving wheel 218 is provided with a gear means 238 which meshes, once each revolution, with the spur gear 240, which is fixedly mounted on a second rotatable pinion 242. This is more clearly shown in FIGURE 21. As will be understood, the rotatable pinion 242 is rotatably mounted with the pinion 236 such that it may rotate free of the pinion 236. On the opposite end of rotatable pinion 242 is firmly fixed a spur gear 244. The spur gear 244 meshes with the gear 246 on the second driving wheel 220. In this manner, as driving wheel 218 is rotated through one full revolution, it will contact spur gear 240 and rotate gear 240 and, therefore, gear 244 so as to advance the driving wheel 220 through one-tenth of a revolution. Of course, indicating or register wheel 214, when coupled or connected to driving wheel 220, will also be driven so as to record the power used, which, in this case, would be ten units of power, inasmuch as register wheel 214 is the tens wheel. In a similar manner, driving wheel 220 is provided with a gear means 247 which co-operates with spur gear 248 on rotatable pinion 250 so as to rotate spur gear 248 on the completion of a revolution of the driving wheel 220 in a manner similar to that previously described. A gear 252, on the opposite end of rotatable pinion 250, meshes with the gear 254 on the driving wheel 222 so as to drive wheel 222 through one-tenth of a revolution for each revolution of the driving wheel 220. From the above it can be seen that a cyclometer register is provided which will provide a ready indication, numerically, in units, tens, and hundreds of the electrical energy which has been used during a given demand interval.

At the end of the demand interval, the cyclometer register wheels will be decoupled from the cyclometer driving wheels and the cyclometer driving wheels will be returned to a zero position for the next demand interval. This demand interval may be a 15-minute, 30-minute, or 60-minute period, the usual demand periods used in demand metering. In order to accomplish this declutching, a cam means 256 is provided which co-operates with the shaft 258, upon which the various indicator or register wheels 212, 214, and 216 are mounted, as shown in FIG. 22, so as to move with the shaft 258. The cam device 256 is rotated by means of a gear 260 which is actuated at the end of the given demand interval by any desired means, such as, for example, by means of a timing motor as set forth with reference to the first embodiment of this invention. Upon rotation of the gear 260, the cam device 256 will be rotated so as to cause the shaft means 258 to be translated to the left, as viewed in FIGURES 16 and 17. FIGURE 17 shows the cam means in the declutching position and the shaft 258 as being moved to the left. As shaft 258 is translated to the left, the indicator or register wheels 212, 214, and 216 are carried with the shaft and are declutched or decoupled from the driving wheels 218, 220, 222 as is clearly indicated in FIGURE 17. As can be seen from FIG. 22, the driving wheels are rotatably mounted on shaft 258, as by means of a bearing 221. However, the register wheels are spring clutch mounted on shaft 258, as indicated by clutch means 215. In this manner, the register wheels will move with shaft 258 when it is translated, but they will also be able to be held fixed while shaft 258 is rotated, as will more clearly appear hereafter.

Each of the driving wheels, 218, 220, 222 is provided with three pins (see FIG. 18) as indicated by the numerals 262, 264, 266, respectively. These pins co-operate with holes in each of the register wheels 212, 214, 216, such as the holes 213 in register wheel 212 as shown in FIG. 23, such that the pins will slide into the holes whenever the driving wheels 218, 220, 222 are in the same numerical position as the register wheels 212, 214, 216. Further, the pins 266 on the hundreds driving wheel 222 are longer than the pins 264 on the tens driving wheel 220 and the pins 264 on the tens driving wheel 220 are longer than the pins 262 on the units driving wheel 218. When the cam means 256 is again rotated out of contact with the shaft 258 the spring device 268 operates to force the shaft to translate back to the right. However, due to the resetting of the wheels 218, 220, 222 to their zero position, the pins 262, 264, 266 will not be in position to slide into the holes on the register wheels 212, 214, 216. Therefore, as the shaft 258 is translated to the right, after the resetting of the driving wheels, the pins 266, on the driving wheel 222, which are the longest pins, will contact the face 267 of the register wheel 216 and prevent further motion of the shaft to the right until such time as the pins 266 are lined up with the holes in the face 267 of the register wheel 216. When the pins 266 slide into the holes on the register wheel 216, the shaft 258 will again translate to the right until the pins 264 contact the face 265 of the register wheel 214. These pins will again hold the shaft from completely translating to the right until the pins 264 match the holes in the face of the indicator wheel 214. At this time, the shaft will again translate to the right until the pins 262 contact the face 263 of the indicator or register wheel 212. These pins will hold the shaft 258 from translating to the right until the pins 262 are in line with the holes 213 in the register wheel 212. At this point the shaft will complete the translation to the right and all of the register wheels will again be in driving relation with or be coupled to the driving wheels 218, 220, 222, respectively. From the above it will be clear that a predetermined clutch means is provided in this embodiment of the invention, in a similar manner as the predetermined clutch means of the first embodiment.

In order to hold the indicator or register wheels 212, 214 and 216 in the register position they were in when decoupled, while the driving wheels 218, 220, 222 are being driven into co-operating position such that the pins will slide into the various holes in the register wheels, a stop means is provided on each of the segments of the cyclometer register co-operating with holes in the opposite face of the various register wheels in the manner indicated in FIGURES 16 and 17, and more clearly shown in FIGURE 18 of the drawing. Referring now to FIGURE 18 of the drawing and considering the wheel there shown as being the driving wheel 222 and the register wheel 216, it will be seen that a keyway 270 is provided in a collar 271, the collar being fixed to the shaft 258, for example, by means of the set screws 272. The keyway 270 co-operates with a key 274 which is mounted in a bearing means 276 which is rotatably mounted in the fixed bearing 278, the bearing 278 being firmly attached to the base plate 224, as is shown in both FIGURES 16 and 17. The relation between the keyway 270 and the key 274 is such that when the shaft 258 is completely translated to the right as shown in FIGURE 16, the keyway 270 and the key 274 are in contact over approximately the first quarter of their adjoining surfaces, allowing the shaft 258 and bearing 276 to rotate in the fixed bearing 278. When the shaft 258 is translated to the left, as shown in FIGURE 17, the keyway 270 slides along the key 274 and the pin 280, which is mounted on the bearing 276, is inserted into one of the ten holes 282 on the back face 283 of the register wheel 216. It will be noted that the face 283 of the register wheel 216 is provided with sloping surfaces about each of the holes 282. This is provided so that any slight misalignment of the register wheel 216 will not prevent pin 280 from entering one of the holes 282. Should register wheel 216 be misaligned, due to a discrepancy in one of the gear means or a similar discrepancy, pin 280 will contact one of the sloping surfaces about the appropriate hole 282, and rotate the register wheel 216 in the proper direction to bring the hole 282 into alignment with the pin 280.

When cam 256 is rotated out of the interval reset position shown in FIG. 17, shaft 258 will start to translate to the right. However, since the driving wheel 222 has been reset to its zero position, as will be more fully described, the face 267 of wheel 216 will abut the pins 266 on the driving wheel 222. As the driving wheel 222 is driven during the next demand interval friction is generated between the pins 266 and the face 267 of register wheel 216. The register wheel 216 is prevented from rotating due to this friction by the pin 280 which holds the register wheel 216 firmly in the indicating position which it had assumed at the end of the first demand interval or the previous demand interval. The pin 280 is sufficiently long such that it will maintain contact in the hole 282 and prevent rotation of the register wheel 216 until wheel 216 has slid partially onto pins 266 and the face 265 of register wheel abuts pins 264. Similar pins are provided for each of wheels 212 and 214, as shown in FIGS. 16 and 17, and function in a similar manner to prevent these register wheels from rotating due to the friction between the pins on the driving wheels and the face plate of the register wheel, prior to the mating of the pins 262 and 264 on the driving wheels with the holes on the respective register wheels.

Whenever the driving wheels 218, 220 and 222 have been driven, during a succeeding demand interval, through a demand which is equal to the demand previously recorded on the indicating or register wheels 212, 214 and 216, respectively, the clutching means hereinbefore described will again make driving contact with the three register wheels 212, 214, and 216 and drive such register wheels to the higher demand thereby recording this demand for the particular demand interval. From the above, it can be seen that there is provided in the second embodiment of this invention a clutching means similar to that disclosed in the first embodiment, whereby the demand register can be driven through a given demand for a specified demand interval and then be declutched or decoupled and the register mechanism will not be recoupled to the driving means until such time as the driving means have been driven through a demand which will equal the demand which is already recorded on the register wheels.

In order to set the driving wheels 218, 220, and 222 to zero at the end of a given demand interval, for example, a 15 minute, 30 minute, or 60 minute demand interval, the mechanism disclosed in FIGURE 19 is utilized. In this fragmentary view of the indicating demand register of this invention driving wheel 222, is shown as provided with a heart cam 284 which is firmly fixed to the shown face of the gear means 254 of the driving wheel 222. Co-operating with the heart cam 284 is a driving arm 286 fixed to a pivoted arm 288, which is pivoted about the point 290. One end of the arm 288 is pressed against a rotating cam 292. The cam 292 is rotated by means of the resetting mechanism (not shown) of the indicating demand register. The arm 288 has its end pressed firmly against the cam 292 by means of the biasing spring 294, as shown in FIGURE 19. As the cam 292 rotates it forces the bottom portion of arm 288 to the left as viewed in FIGURE 19 about the pivot 290. At the same time, the arm 286 is also forced to the left about pivot 290, causing the point 296 of arm 286 to press against the heart cam 284, thereby rotating the driving wheel 222 about the shaft 258 back to its zero position. As will be well understood, the heart cam 284 is rotated about shaft 258 until the point 296 of the arm 286 fits into the depression 298 on the heart cam 284. At this point the heart cam 284 has reset the driving wheel 222 back to its zero position. From the above it may be readily seen that means are provided for resetting each of the driving wheels 218, 220 and 222 back to their zero position at the end of each demand interval.

In order to disengage the driving means, comprising the gear devices 232, 244, and 252 from the gears 234, 246 and 254 on the driving wheels 218, 220, and 222, respectively, during the reset interval, to prevent binding of the driving wheels during the resetting and, also, in order to move the gears 240, and 248 out of engagement with the gear means 238 and 247 on the driving wheels 218, and 220, respectively, during the resetting interval, the device shown in FIGURE 20 is provided. Referring to FIGURE 20, a cam means 300 is provided similar to cam 292 co-operating with a crank arm 302 which is pivoted about the point 304, to disengage the driving gears from the driving wheels. As shown in FIGURE 20, the driving gear 254 on the driving wheel 222 is meshed with the spur gear 252 on the pinion 250. The pinion 250 extends through the arm 306 of the crank 302 and, as the crank 302 is caused to pivot about point 304 by the movement cam 300, the arm 306 pivots in a downwardly direction, thereby carrying with it the driving gear 252, thus decoupling the driving gear 252 from the gear 254 on the driving wheel 222. Pinion 250 is rotatably connected to the side of pivotal plate 309. Thus, crank 302 also pivots plate 309 away from gear 254 against the force of spring 308. As shown the spring means 308 is provided to bias plate 309 and thus crank 302 in a direction such that the gear 252 will mesh with gear 254. Therefore, when the cam 300 has been rotated to the non-interfering position, the spring means 308 will pull the gear 252 back into mesh with the gear 254 on the driving wheel 222. The gears 232, 240, 244 and 248 are decoupled from the various co-operating gears on the driving wheels 218 and 220, by this action of crank 302. The various pinions 236, 242 and 250 are each connected to each other and to the sides of movable plate 309. Thus, pinions 236, 242 and 250 and plate 309 move with the action of crank 302. This can also be seen from FIGURES 16 and 17 of the drawing, where the spring means 308 is shown both at the left- and right-hand side of each figure connected at one end to plate 309. The other end of the spring means 308 is firmly attached to the spacing means 226 as shown. Thus, it can be seen that during the resetting interval of the indicating demand register, the driving spur gears are decoupled from meshing engagement with the gears on the driving wheels 218, 220 and 222 thereby allowing them to be reset by means of the heart cam means shown in FIGURE 19.

At the end of the monthly interval, when the reading on the indicating demand register has been taken by the meter reader, the register wheels are then reset to zero by means of the knurled knob 310 which is firmly mounted on the end of shaft 258, as is shown in FIGURES 16 and 17 of the drawing. When the meter reader desires to reset the register wheels to zero, he merely pulls the knurled knob 310 to the left, thereby causing the shaft 258 to translate to the left, decoupling the indicator wheels 212, 214 and 216 from their driving wheels 218, 220, and 222, respectively. After a small rotation of the knurled knob 310 towards the resetting position spring 268 is allowed to force the register wheel 216 against the pins 266 in a similar manner to that disclosed at the end of the demand interval reset. Then, continued rotation of the knob 310 will cause rotation of the wheel 216 until such time as the pins 266 are in position with the holes in the wheel 216. At this point, as the wheel 216 slides in to engagement with the pins 266, the base plate of the indicator or register wheel 214 then comes into engagement with pins 264 on the driving wheel 220. The wheel 216 is decoupled from the pin 280 and, due to its spring clutch mounting on the shaft 258, remains coupled to the driving wheel 222 in the position which the driving wheel 222 has obtained during the particular demand interval. At the same time the indicator or register wheels 214 and 212 are continually rotated by the knob 310 until wheel 214 is in position to engage the pins 264 on the driving wheel 220. At this point, the wheel 214 will slide into engagement with the pins 264 on the driving wheel 220 and will become disengaged with the holding pin on the bearing means relating to the indicator wheel 214. Due to the spring clutch means by which the wheel 214 is mounted on the shaft 258, indicator wheel 214 will be held in engagement with the driving wheel 220 while the indicator or register wheel 212 is driven into engagement with pins 262 on the driving wheel 218. Then as wheels 212 come in coupling position with pins 262 on the driving wheel 218, the indicator or register wheel 212 will then be coupled to the driving wheel 218 by means of pins 262. The meter reader does not further turn the knurled knob 310, and at this point the shaft 258 will have completed its translation to the right as shown in FIGURE 16. From the above it will be seen that at the monthly reset of the cyclometer indicating demand register of this embodiment that, rather than setting the demand register completely back to zero, the demand register is set at the instantaneous demand which has been recorded during the portion of the interval, and thus this demand interval recording is not lost. Of course, as will be well understood, when the meter reader sets the demand register back toward zero at the monthly reading, the register may be at any point during the demand interval of 15 minutes, 30 minutes, or 60 minutes. If the register were completely reset to zero, whatever demand had been previously used during that portion of the demand interval would be lost to the demand register. By means of the cyclometer indicator demand register of this embodiment, it is possible to reset at the monthly period to the instantaneous demand used during that portion of the demand interval, rather than completely resetting the recording of the register dials to a zero indication. Thus, it is seen that the cyclometer register of this invention provides an added advantage which is not found in the simplified indicating demand register utilizing the dial means as disclosed in the first embodiment of this invention.

While there has been shown and described, the presently preferred embodiments of the indicating demand register of this invention, it will be well understood by those skilled in the art that various changes and modifications may be made in these embodiments. Of course it will be understood that, in its broader aspects, this invention is not limited to an indicating demand register. Obviously, it may be utilized in any type of counting mechanism for counting a quantity of any desired type. It is, therefore, to be understood that the description hereinbefore set forth is not to be considered a limitation on the invention, but that changes may be made within the spirit and scope of the invention as set forth in the appended claims.

What I claim as new and desire to secure by Letters Patent of the United States is:

1. An indicating register for counting comprising: a first plurality of cooperative rotary indicating members of successively higher order which together give an indication of a quantity being counted; drive means driven in accordance with a quantity to be counted in each of a plurality of successive intervals of time, said drive means having a second plurality of cooperative rotary indicating members of successively higher order corresponding to said first plurality of indicating members; and predetermined clutch means, including means between said first and said second plurality of indicating members for coupling said drive means to said indicating members whenever said drive means is driven in an interval in accordance with a quantity which equals the quantity indicated by said indicating member.

2. A maximum demand meter comprising; demand impulse counting means including a maximum demand indicating register which has a first plurality of shafts adapted to rotate through more than one revolution when counting demand; driving means including a second plurality of rotatably mounted shafts which are adapted to rotate through a plurality of revolutions in accordance with the demand to be measured, said driving means normally engaging said counting means for advancing said register from a zero position in accordance with the demand to be measured, said second plurality of rotatable shafts having zero positions corresponding to the zero position of said register; means operative at the end of each demand interval to disengage said driving means from said counting means; means to reset said second plurality of rotatable shafts to said zero positions after said disengagement; and means between said driving means and said counting means preventing engagement of said driving means with said counting means during subsequent demand intervals until the demand in any subsequent interval equals the amount previously counted by said counting means.

3. A maximum demand meter comprising; demand impulse counting means including a maximum demand indicating register which has a first plurality of shafts adapted to rotate through more than one revolution when counting demand; driving means including a second plurality of rotatably mounted shafts which are adapted to rotate through a plurality of revolutions in accordance with the demand to be meausred, said driving means normally engaging said counting means for advancing said register from a zero position in accordance with the demand to be measured, said second plurality of rotatable shafts having zero positons corresponding to the zero position of said register; means operative at the end of each demand interval to disengage said driving means from said counting means; means holding said register at its reading of demand measured prior to said disengagement; means to reset said second plurality of rotatable shafts to said zero positions after said disengagement; and means between said driving means and said counting means preventing engagement of said driving means with said counting means until said second plurality of shafts have been rotated by a demand measured in a succeeding demand interval equal to the reading being held by said register, at which time said last-named means operate automatically to engage said driving means with said counting means.

4. A maximum demand meter, comprising: a maximum demand register having a plurality of co-operative rotary counting members of successively higher order which together count demand; each of said rotary members having a first axial position; driving means for advancing said rotary counting members from a zero position in accordance with the demand to be measured, said driving means having a zero position corresponding to the zero position of said register; means coupling said rotary members to said driving means when each of said rotary members is in its first axial position; means operative at the end of each demand interval to move said rotary members to a second axial position at which position they are uncoupled from said driving means; means holding said rotary members at their angular positions corresponding to the demand counted prior to said uncoupling; means to reset said driving means to its zero position; and means preventing said rotary members from returning to their first axial position in succeeding demand intervals until said driving means is driven in an interval in accordance with a demand which equals that being held by said rotary counting members at which time said last named means operates to allow all said rotary members to return to their first axial position where they are automatically coupled to said driving means.

5. A maximum demand meter, comprising: a maximum demand register having a plurality of first co-operative rotary counting members of successively higher order; driving means for advancing said first rotary counting members from a zero position in accordance with the demand to be measured in successive demand intervals, said driving means having a plurality of second co-operative rotary counting members of successively higher order corresponding to said first counting members and aligned axially therewith; each pair of corresponding first and second counting members having a predetermined angular relationship; and means coupling said driving means to said maximum demand register whenever each pair of corresponding first and second counting members simultaneously attain said predetermined angular relationship.

6. A maximum demand meter comprising: demand impulse counting means including a maximum demand indicating register which has a plurality of shafts adapted to rotate through more than one revolution when counting demand; driving means normally engaging said counting means for advancing said register from a zero position in accordance with the demand to be measured, said driving means having a zero position corresponding to the zero position of said register; means, including a pivoted means carrying said plurality of shafts, operative at the end of each demand interval to disengage said driving means from said counting means; means holding said register at its reading of demand measured prior to said disengagement; means to reset said driving means to its zero position after said disengagement; said resetting means including means movable into engagement with said pivoted means to effect disengagement of said driving means; and means preventing engagement of said driving means with said counting means until the demand measured in a succeeding demand interval equals the reading being held by said register at which time said last named means operate automatically to engage said driving means with said counting means.

7. A maximum demand meter comprising: demand impulse counting means includes a maximum demand indicating register which has a first plurality of shafts adapted to rotate through more than one revolution when counting demand; driving means, including a second plurality of shafts, normally engaging said counting means for advancing said register from a zero position in accordance with the demand to be measured, said driving means having a zero position corresponding to the zero position of said register; means operative at the end of each demand interval to disengage said driving means from said counting means; means holding said register at its reading of demand measured prior to said disengagement; means to reset said driving means to its zero position after said disengagement; and means preventing engagement of said driving means with said counting means, said last named means including means on said second plurality of shafts in interferring relation with means on said first plurality of shafts until the demand measured in a succeeding demand interval equals the reading being held by said register at which time said interfering means operate automatically to engage said driving means with said counting means.

8. A maximum demand meter comprising: demand impulse counting means including a maximum demand indicating register which has a first plurality of rotary members adapted to rotate through more than one revolution when counting demand; driving means including a second plurality of rotary members, normally engaging said counting means for advancing said register from a zero position in accordance with the demand to be measured, said driving means having a zero position corresponding to the zero position of said register; means operative at the end of each demand interval to disengage said driving means from said counting means; means to reset said driving means to its zero position after said disengagement; and means preventing engagement of said driving means with said counting means, said engagement preventing means including means on said first plurality of rotary members in interfering relation with means on said second plurality of rotary members until the demand measured in a succeeding interval equals the reading being held by said register at which time said interfering means operate automatically to engage said driving means with said counting means.

9. A maximum demand meter, comprising: a maximum demand register having a first plurality of co-operative rotary counting members of successively higher order which together give an indication of demand; driving means for advancing said first plurality of rotary counting members from a zero position in accordance with the demand to be measured, said driving means having a second plurality of rotary counting members with a zero position corresponding to the zero position of said register; predetermined clutch means for coupling said drive means to said register when each of said first and second plurality of rotary counting members are at the zero position; means operative at the end of each demand interval to uncouple said driving means from said register; means holding said first plurality of rotary counting members at their reading of demand measured prior to said uncoupling; and means to reset said driving means to its zero position after said uncoupling; said predetermined clutch means operating automatically to couple said driving means to said register only when the demand measured in any succeeding demand interval equals the reading of demand being held in said register.

10. A maximum demand meter, comprising: a maximum demand register having a first plurality of co-operative rotary counting members of successively higher order which together give an indication of demand; driving means for advancing said first plurality of rotary counting members from a zero position in accordance with the demand to be measured, said driving means having a second plurality of rotary counting members with a zero position corresponding to the zero position of said register; predetermined clutch means for coupling said drive means to said register when each of said first and second plurality of rotary counting members are at the zero position; means operative at the end of each demand interval to uncouple said driving means from said register; means holding said first plurality of rotary counting members at their reading of demand measured prior to said uncoupling; and means to reset said second plurality of rotary counting members to their zero position after said uncoupling; said predetermined clutch means operating automatically to couple said driving means to said register only when said second plurality of rotary counting members in any succeeding demand interval have advanced to the reading of demand being held in said register.

11. A maximum demand meter, comprising: a maximum demand register having a plurality of co-operative rotary counting members of successively higher order which together give an indication of demand; driving means for advancing said rotary counting members from a zero position in accordance with the demand to be measured, said driving means having a plurality of other cooperative rotary counting members of successively higher order corresponding to said first counting members, said driving means having a zero position corresponding to the zero position of said register; predetermined clutch means for coupling said drive means to said register when each are at the zero position; means operative at the end of each demand interval to uncouple said driving means from said register; means holding said rotary counting members at their reading of demand measured prior to said uncoupling; and means to reset said driving means to its zero position after said uncoupling; said predetermined clutch means including interfering means between said first and said other plurality of rotary counting members preventing coupling between said drive means and said register means until the demand measured in any succeeding demand interval equals the reading of demand being held in said register.

12. A maximum demand meter, comprising: a maximum demand register having a plurality of first co-operative rotary counting members of successively higher order; driving means for advancing said first rotary counting members from a zero position in accordance with the demand to be measured in successive demand intervals, said driving means having a plurality of second co-operative rotary counting members of successively higher order corresponding to said first counting members and aligned axially therewith; each pair of corresponding first and second counting members having a predetermined angular relationship; and means coupling said driving means to said maximum demand register whenever each pair of corresponding first and second counting members simultaneously attain said predetermined angular relationship, said coupling means including means to control the axial spacing between each pair of corresponding first and second rotary members in accordance with the relative angular relationships attained.

13. A maximum demand meter, comprising: a maximum demand register having a plurality of first co-operative rotary counting members of successively higher order; driving means for advancing said first rotary counting members from a zero position in accordance with the demand to be measured in successive demand intervals, said driving means having a plurality of second co-operative rotary counting members of successively higher order corresponding to said first counting members and aligned axially therewith; each pair of corresponding first and second counting members having a predetermined angular relationship; means coupling said driving means to said maximum demand register whenever each pair of corresponding first and second counting members simultaneously attain said predetermined angular relationship, means operative at the end of each demand interval to uncouple said driving means from said maximum demand register, and means to reset said plurality of second co-operative rotary counting members to a zero position, said coupling means including means to control the axial spacing between each pair of corresponding first and second rotary members in accordance with the relative angular relationships attained.

14. A maximum demand meter, comprising: a maximum demand register having a plurality of first co-operative rotary counting members of successively higher order; driving means for advancing said first rotary counting members from a zero position in accordance with the demand to be measured in successive demand intervals, said driving means having a plurality of second co-operative rotary counting members of successively higher order corresponding to said first counting members and aligned axially therewith; each pair of corresponding first and second counting members having a predetermined angular relationship; means coupling said driving means to said maximum demand register whenever each pair of corresponding first and second counting members simultaneously attain said predetermined angular relationship, means coupling said driving means to said maximum demand register whenever each pair of corresponding first and second counting members simultaneously attain said predetermined angular relationship, means operative at the end of each demand interval to uncouple said driving means from said maximum demand register, and means to reset said plurality of second co-operative rotary counting members to a zero position;

15. A maximum demand meter, comprising: a maximum demand register having a plurality of first co-operative rotary counting members of successively higher order; driving means for advancing said first rotary counting members from a zero position in accordance with the demand to be measured in successive demand intervals, said driving means having a plurality of second co-operative rotary counting members of successively higher order corresponding to said first counting members; said first co-operative rotary counting members mounted on a first plurality of rotatable shafts; said second co-operative rotary counting members mounted on a second plurality of rotatable shafts axially aligned with said first plurality of rotatable shafts; each pair of corresponding first and second counting members having a predetermined angular relationship; and means coupling said driving means to said maximum demand register whenever each pair of corresponding first and second counting members simultaneously attain said predetermined angular relationship, said coupling means including means to control the axial spacing between each pair of corresponding first and second rotary members in accordance with the relative angular relationships attained.

16. A maximum demand meter, comprising: a maximum demand register having a plurality of first co-operative rotary counting members of successively higher order; driving means for advancing said first rotary counting members from a zero position in accordance with the demand to be measured in successive demand intervals, said driving means having a plurality of second co-operative rotary counting members of successively higher order corresponding to said first counting members; said first and said second co-operative rotary counting members being alternately spaced along a single rotatable shaft, said first co-operative rotary counting being spring clutch mounted on said shaft so as to be rotatable therewith, said second co-operative rotary counting members being freely mounted on said shaft; each pair of corresponding first and second counting members having a predetermined angular relationship; and means coupling said driving means to said maximum demand register whenever each pair of corresponding first and second counting members simultaneously attain said predetermined angular relationship, said coupling means including means to control the axial spacing between each pair of corresponding first and second rotary members in accordance with the relative angular relationships attained.

References Cited in the file of this patent

UNITED STATES PATENTS

| | | |
|---|---|---|
| 2,147,895 | Hamill | Feb. 21, 1939 |
| 2,484,396 | Allen | Oct. 11, 1949 |
| 2,650,026 | Amsbary | Aug. 25, 1953 |
| 2,923,886 | Widmer | Feb. 2, 1960 |

UNITED STATES PATENT OFFICE
CERTIFICATE OF CORRECTION

Patent No. 3,092,318                          June 4, 1963

Donald M. Ham

It is hereby certified that error appears in the above numbered patent requiring correction and that the said Letters Patent should read as corrected below.

Column 2, line 22, after "pusher" insert -- of --; line 30, for "traverving only a small distance" read -- traversing only a small distance. --; line 42, after "such" insert -- a --; column 5, line 18, for "46" read -- 56 --; column 8, line 30, for "disk" read -- disks --; column 9, line 20, for "In" read -- in --; column 16, line 58, for "positons" read -- positions --; column 17, line 63, for "includes" read -- including --; column 20, line 11, begining with "means coupling" strike out all to and including "angular relationship," in line 14, same column 20.

Signed and sealed this 24th day of December 1963.

(SEAL)
Attest:
ERNEST W. SWIDER

EDWIN L. REYNOLDS

Attesting Officer                         Acting Commissioner of Patents